US008389102B2

(12) United States Patent
Sikora et al.

(10) Patent No.: US 8,389,102 B2
(45) Date of Patent: Mar. 5, 2013

(54) GRIPPING AREA FOR A WORKING DEVICE

(75) Inventors: Bernhard Sikora, Kelkheim (DE); Roland Ullmann, Offenbach (DE)

(73) Assignee: Braun GmbH, Kronberg (DE)

( * ) Notice: Subject to any disclaimer, the term of this patent is extended or adjusted under 35 U.S.C. 154(b) by 0 days.

(21) Appl. No.: 13/218,492

(22) Filed: Aug. 26, 2011

(65) Prior Publication Data

US 2011/0311771 A1 Dec. 22, 2011

Related U.S. Application Data

(63) Continuation of application No. PCT/IB2010/051241, filed on Mar. 22, 2010.

(30) Foreign Application Priority Data

Mar. 28, 2009 (DE) ........................ 10 2009 015 433

(51) Int. Cl.

| | |
|---|---|
| ***D06N 7/04*** | (2006.01) |
| ***G11B 5/64*** | (2006.01) |
| ***B32B 3/00*** | (2006.01) |
| ***B25G 1/10*** | (2006.01) |

(52) U.S. Cl. ............. 428/141; 428/156; 16/421; 16/430

(58) Field of Classification Search .................. 428/141; 16/430, 421, 431–446; 473/202, 203, 288–303, 473/596–597, 614

See application file for complete search history.

(56) References Cited

U.S. PATENT DOCUMENTS

| | | | | |
|---|---|---|---|---|
| 1,690,557 | A | 11/1928 | Smith | |
| 2,983,512 | A * | 5/1961 | Fleischer | 473/568 |
| 5,234,740 | A | 8/1993 | Reeves et al. | |

(Continued)

FOREIGN PATENT DOCUMENTS

| | | | |
|---|---|---|---|
| DE | 29515667 | U1 | 12/1995 |
| DE | 10 2004 052 681 | A1 | 9/2005 |
| EP | 1 127 529 | A1 | 8/2001 |
| EP | 1764191 | A2 | 3/2007 |
| GB | 2185209 | A | 7/1987 |
| WO | WO-2004018163 | A1 | 3/2004 |
| WO | WO-2007125222 | A1 | 11/2007 |

OTHER PUBLICATIONS

U.S. Appl. No. 13/218,486, filed Aug. 26, 2011, Bernhard Sikora et al.

(Continued)

*Primary Examiner* — David Sample
*Assistant Examiner* — Nathan Van Sell
(74) *Attorney, Agent, or Firm* — David K Mattheis; Kim W Zerby

(57) ABSTRACT

The present invention relates to a gripping area and a surface structure for a working device. In particular, the invention relates to a surface structure for a working device, which has at least one curved surface, on which there is a first surface normal and a second surface normal, which forms an α angle, wherein the surface structure comprises a base structure, which has a base surface and at least one side surface, wherein the side surface, along with the base surface, forms a β angle, and wherein the surface normal of the base surface of the base structure is parallel to the first surface normal, wherein the surface structure further comprises a variant structure, which comprises a base surface and at least one side surface, wherein a γ angle is formed between the base surface and the side surface, wherein the variant structure is different from the base structure and wherein the surface normal of the base surface of the variant structure is parallel to the second surface normal, and the γ angle is smaller than the β angle by at least the amount of the α angle. The invention also relates to a working device with such a surface.

11 Claims, 6 Drawing Sheets

U.S. PATENT DOCUMENTS

| | | | | |
|---|---|---|---|---|
| 6,075,221 | A | 6/2000 | Minhas | |
| 6,108,870 | A | 8/2000 | Lo | |
| 7,044,020 | B2 * | 5/2006 | Rosenthal | 74/551.9 |
| 2003/0088946 | A1 | 5/2003 | Ferguson et al. | |
| 2005/0172492 | A1 * | 8/2005 | Blaustein et al. | 30/43.92 |
| 2007/0067960 | A1 | 3/2007 | Lee et al. | |
| 2008/0118709 | A1 * | 5/2008 | Sims et al. | 428/141 |
| 2008/0163500 | A1 | 7/2008 | Bozikis et al. | |
| 2009/0139108 | A1 * | 6/2009 | Ricklefs et al. | 34/130 |

OTHER PUBLICATIONS

International Search Report dated Jul. 7, 2010, 7 pages.
International Search Report dated Jun. 30, 2010, 7 pages.

* cited by examiner

GRIPPING AREA FOR A WORKING DEVICE

CROSS REFERENCE TO RELATED APPLICATIONS

This application is a continuation application of prior co-pending International Application No. PCT/IB2010/051241, filed Mar. 22, 2010, designating the United States.

SCOPE OF THE INVENTION

The present invention relates to a gripping area and a surface structure for a working device. This surface structure is intended, first of all, to ensure good gripping of the surface. The following devices are considered, for example, to be working devices in terms of the invention described and claimed herein: non-motor-driven and motor-driven devices, craftsman tools, household appliances, particularly motor-driven household appliances as well (handheld blender, hand mixer, immersion blender), wet shavers (including electric razors), electric shavers, hair care devices (hair dryer, curling iron, straightening iron), and devices for hair removal (especially depilating devices). The invention also relates to a working device with such a surface structure.

BACKGROUND OF THE INVENTION

U.S. Pat. No. 1,690,557 discloses a wet shaver with a metallic handle. This handle has the shape of a cylindrical rod and has protrusions on its surface. Such protrusions can be created by applying a pattern of parallel lines. The protrusions then have a diamond-shaped base surface and appear as small pyramids. The pattern shown is applied evenly over the entire gripping surface. Such a pattern is primarily suitable for metallic surfaces. When the handle is wet, however, the grip is not optimal. Because the protrusions are all of equal height, the fingers do not have as much hold, particularly as soon as one finger slips off.

DE 10 2004 052 681 A1 discloses a handle, which should be suitable for a multitude of devices. Said handle has so-called acupressure features, which adapt to fit the inside surface of the hand. Thus, the handle provides for a very particular type of hand position. If the device is held in a different position, it is difficult to grip. In fact, with a different grip position, it provides even less secure grip and comfortable grip than a smooth grip. As a result, the advantage of proposing a certain grip position is obtained in exchange for less suitability of the handle for other grip positions.

EP 1 127 529 A1 discloses a vacuum cleaner with a handle section. Said handle section is created by combining a harder plastic material with a softer, more graspable plastic material. The softer plastic material protrudes, in the form of knobs, beyond the hard plastic surface. Thus, the gripping hand obtains a certain amount of security from the knobs. With an electrically operated device however, the grip comfort is at its greatest when the vibrations caused by the electric drive of the device and which are practically unavoidable are transferred to the hand to a limited extent. The disclosed surface comprising hard plastic, which is much larger than the surface of the knobs, does, however, ensures a significant transmission of vibrations.

Therefore, the present invention strives to improve the prior art and to provide an improved surface structure and an improved gripping area for a working device. The surface structure should enable a secure grip and different grip positions while still approaching an optimum grip position. Furthermore, said surface structure should transfer vibrations from the working device in a limited amount and represent an aesthetically pleasing structure.

DETAILED DESCRIPTION OF THE INVENTION

A surface structure having said advantages is the surface structure claimed in claim 1. The surface structures of the dependent claims offer specific advantages.

According to the invention, a surface structure is thus provides for a working device which has at least one curved surface. On said surface, there is thus at least one direction in which a curvature occurs. Along this direction, there is at least a first surface normal and a second surface normal on the surface, which forms an $\alpha$ angle, which is not equal to zero.

The curved surface has an apex or an apex axis if the surface is not curved in one direction. The first surface normal can advantageously be selected such that it runs through the apex or the apex axis.

The surface structure has a base structure. Said base structure comprises at least one base surface and at least one side surface. The side surface, along with the base surface, forms a $\beta$ angle. In doing so, the base surface is arranged on the base structure such that the surface normal is in the center of the base surface, parallel to the surface normal of the curved surface, at the location of the base structure (with the location of the center of the base surface optionally being the base structure). Thus, the base surface can lie on a section of the surface structure. If the base structure is an integral part of the surface structure, the base surface of the base structure results from extrapolation of the surface structure in the vicinity of the base structure. The surface structure further comprises a variant structure, which likewise comprises a base surface and a side surface. A $\gamma$ angle is formed between the base surface and the side surface of the variant structure. According to the invention, the variant structure is different from the base structure, and the $\gamma$ angle is smaller than the $\beta$ angle by the amount of the $\alpha$ angle.

It has proven to be advantageous when the angle between the base surface and the side surface is measured and is farthest away from the apex of the curvature. In doing so, it may be best to measure at the point of the base or variant structure that is farthest away from the apex.

A suitable variant structure would be a structure similar to the base structure in a mathematical sense (i.e., that results from enlarging or reducing the base structure).

In an embodiment of the invention, the curved surface is not curved in direction F. Such surfaces can be, for example, cylindrical surfaces, which are particularly suitable as gripping surfaces for a working device.

In an embodiment of the invention, the base structure is repeated in this direction F. For example, a multitude of base structures can be repeated equidistantly in direction F. This can be more than 10, more than 25, or more than 100 base structures.

In an embodiment of the invention, the surface structure can have a direction of the curvature W, perpendicular to the direction F, in which it is curved. According to an embodiment of the invention, the surface structure can have a variant structure in direction W.

In an embodiment of the invention, the surface structure can have a multitude of variant structures in direction W.

In an embodiment of the invention, the respective $\gamma$ angle can continuously decrease with said multitude of variant structures.

In an embodiment of the invention, all $\gamma$ angles can be less than 45° with the multitude of variant structures. Said embodiment prevents sharp gripping edges.

In an embodiment of the invention, the surface structure comprises at least one base structure having two mirror-image base structural elements and one variant structure having two mirror-image variant structural elements.

DESCRIPTION OF THE FIGURES

FIG. 1 shows a curved surface 10 in direction W. Perpendicular to direction W, in direction F, the surface 10 is flat. On this surface 10, the base structures 20 are depicted in the area shown in the center of the surface. The base structures repeat themselves in direction F as well as in direction W. Together with the surface, these base structures result in a surface structure in terms of the invention. Variant structures 30 are depicted at the edge of the surface 10. The variant structures also repeat in direction F.

FIG. 2 shows a cross-section through the surface structure shown in FIG. 1. The surface 10 of the subject matter has a first normal 12. The first normal 12 runs through the apex axis of the surface 10. In addition, the surface has a second normal 14 in the α angle. The surface has a base structure 20, which has a base surface 22 and a side surface 24. The side surface 24 forms a β angle with the surface. The surface 10 further has a variant structure 30. The variant structure 30 has a base surface 32 and a side surface 34. The side surface 34 forms a γ angle with the surface 10. It is observable that the γ angle is smaller than the β angle. According to the invention, the γ angle is smaller than the β angle at least by the amount of the α angle. This means that, in this figure, the variant structure has a γ angle that becomes smaller, the further away it is from the base structure. Therefore, a variant structure 30 that is far away from the base structure 20 is a structure that protrudes only slightly beyond the surface 10.

FIG. 3 shows a cross-section of an alternative arrangement of the base structure and a variant structure. In this arrangement, there is a first base structure 120 on one side of the apex of the curved surface (indicated by the passage point of the normal 12) and a correspondingly mirror-image base structure 121 on the other side of the apex of the curved surface. The base structure 120 repeats itself on the surface in a mathematically similar variant structure 130. Angle γ.1, which represents the angle of a side surface of the variant structure with the base surface, is smaller than the corresponding β angle. Furthermore, another variant structure 131 is shown, which is similar to the base structure 121; however, it has, in turn, a γ.2 angle between a side surface and the base surface that is smaller than the β angle. Angle γ.2 is also smaller than angle γ.1, because the variant structure 131 is a distance away from the base structure 120 by a larger a angle, along the direction of the curvature W. FIG. 3 also shows variant structures 140 and 141, which represent mathematically similar reductions of the basic structure 121. They have the same angle between the side surface and the base surface. Accordingly, the β angle, in turn, is larger than angle γ.1 of variant structure 140, which, for its part, is larger than angle γ.2 of variant structure 141.

FIG. 4 shows a cross-section of another embodiment of the invention. In this case, a base structure 220 is provided for, which comprises two mirror-image elements: the base structural element 220*a* and the base structural element 220*b*. In the mirror plane for the base structures, the apex axis of the surface runs as is shown for the normal 12. This base structure, 220, is also repeated in variant structures. Said variant structures are mathematically similar to the base structure. Consequently, they also receive two elements.

Variant structures 230 and 231 (with their elements: 230*a*, 230*b*, 231*a*, and 231*b*) are adjacent to the base structure. Variant structures 240 and 241 are located further to the outside, along the direction of the curvature W of the surface. Those variant structures farther away from the base structure have, in turn, a smaller angle between the side surface and the base surface. Angles γ1 and γ2 of structure 230 are the same size as the corresponding angles γ1 and γ2 of structure 231. It should be noted that angles γ1 and γ2 are not the same size as each other even though the structures are mirror images. Angles γ1 and γ2 are measured, namely, at the side surface that is farthest away from the apex of the curvature.

Variant structures 240 and 241 (with their elements: 240*a*, 240*b*, 241*a*, and 241*b*) are farther away from the base structure. They are similar to the base structure as well as to variant structures 230 and 231. However, their angles are smaller than the corresponding angles of variant structures 230 and 231. Therefore, angle γ3 is smaller than the corresponding angle γ1, and angle γ4 is smaller than the corresponding angle γ2. The difference between γ1 and γ3 is determined by the position of their apexes on the curved surface and corresponds to the difference between angles α1 and α3. Angles α1 and α3 are each determined, with respect to the normal, by the apex axis. Accordingly, this results in the difference between angles γ2 and γ4.

Figure 1:
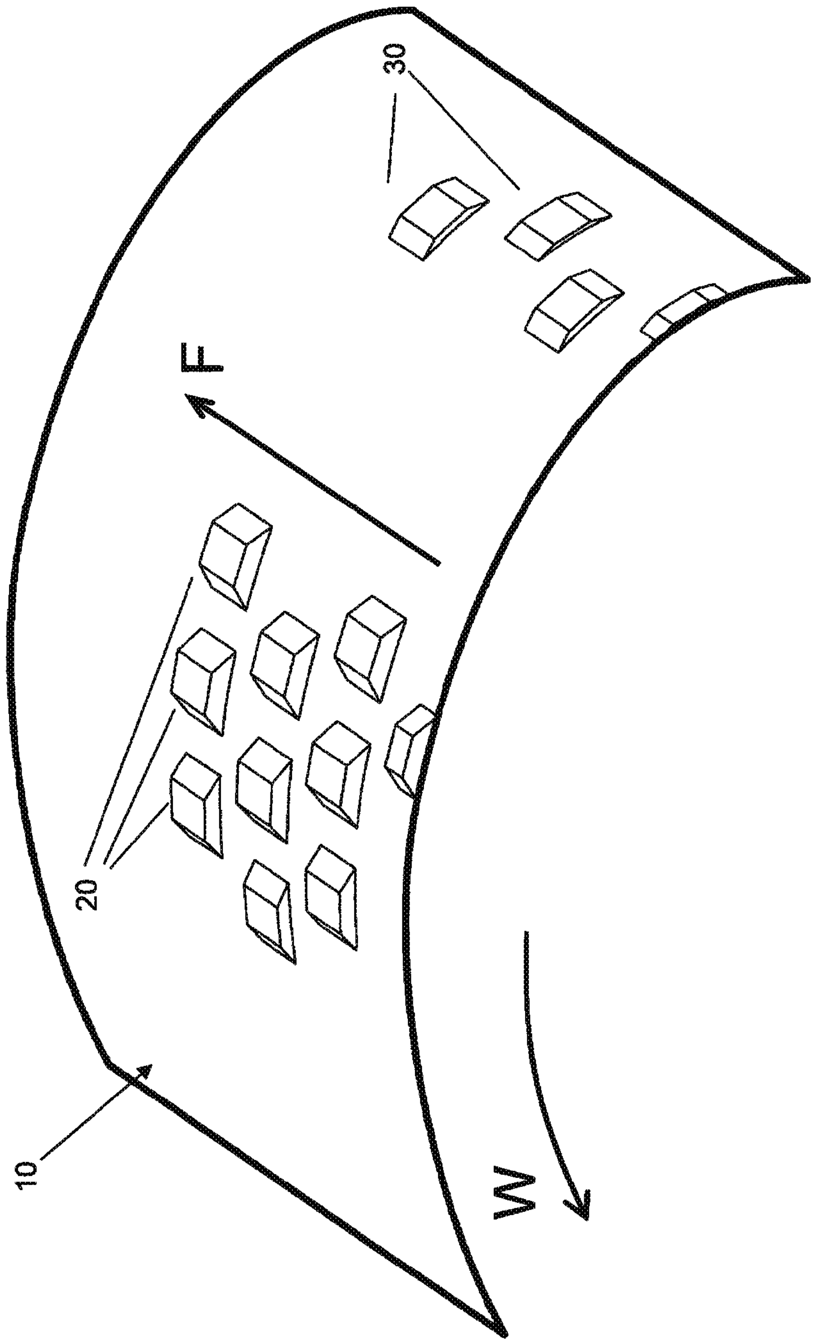
FIG. 1 shows a three-dimensional view of an inventive surface structure.
Figure 2:
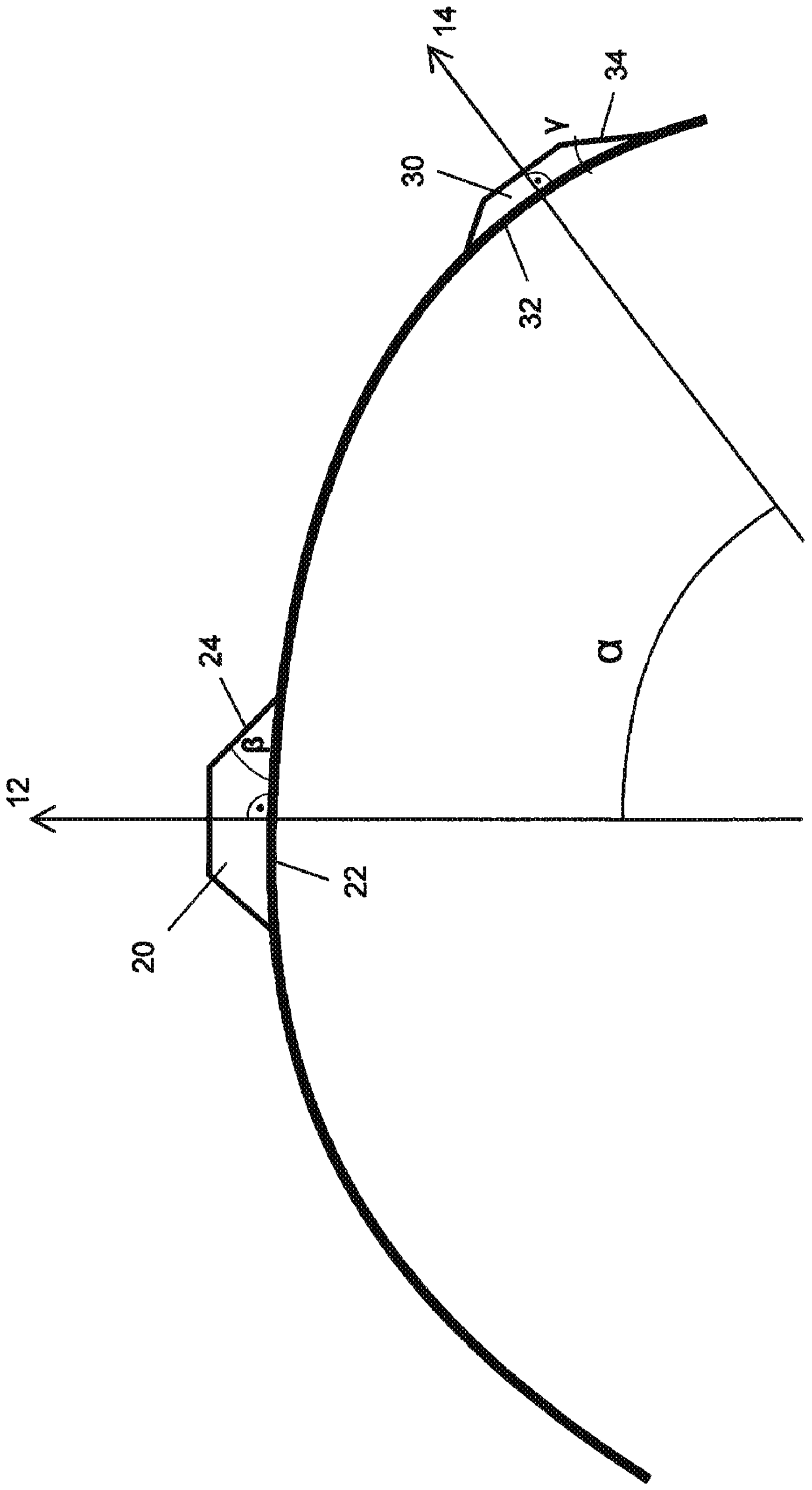
FIG. 2 shows a cross-section through the structure of FIG. 1.
Figure 3:
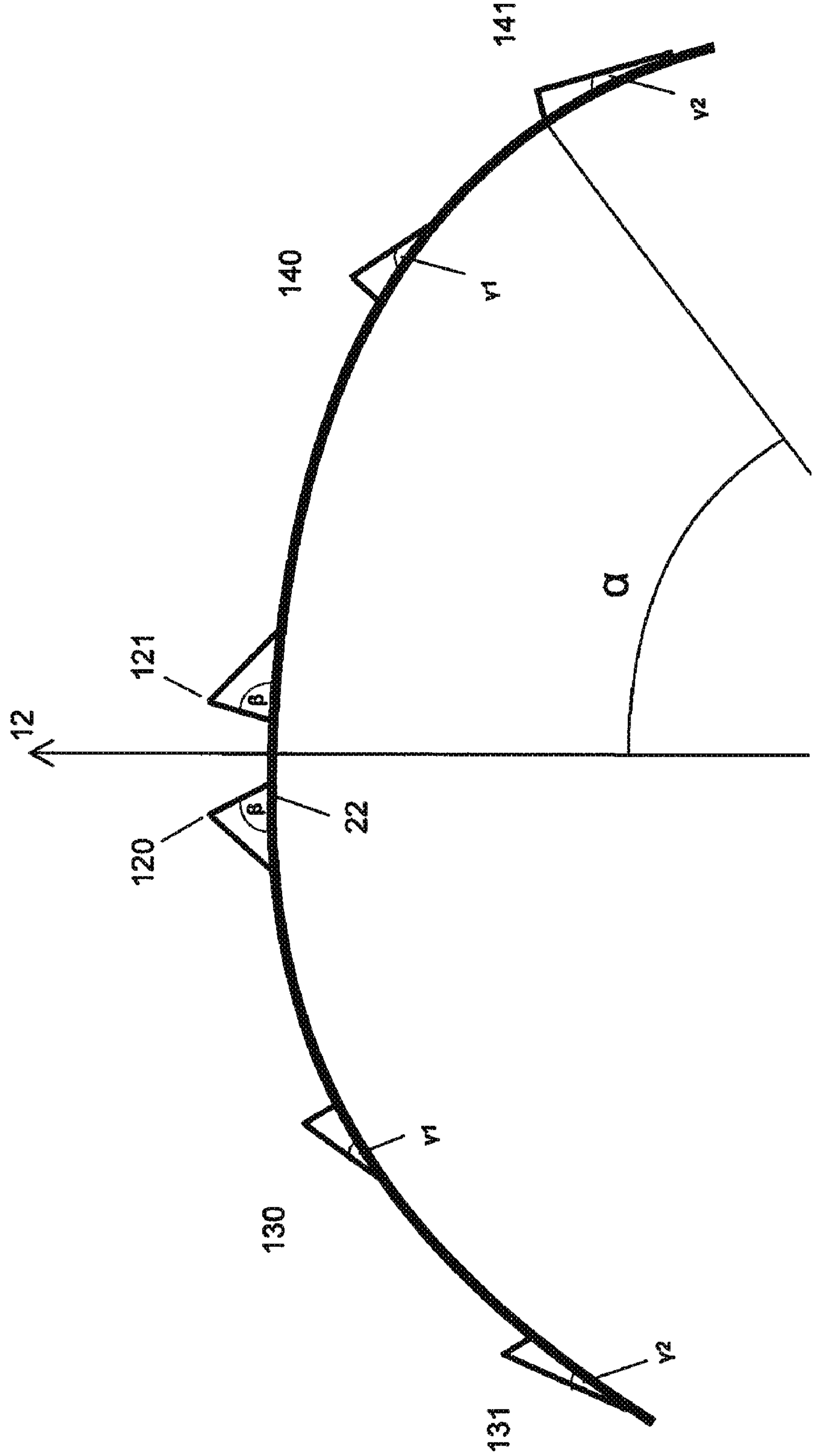
FIG. 3 shows a cross-section, similar to FIG. 2, through an alternative embodiment of the invention.
Figure 4:
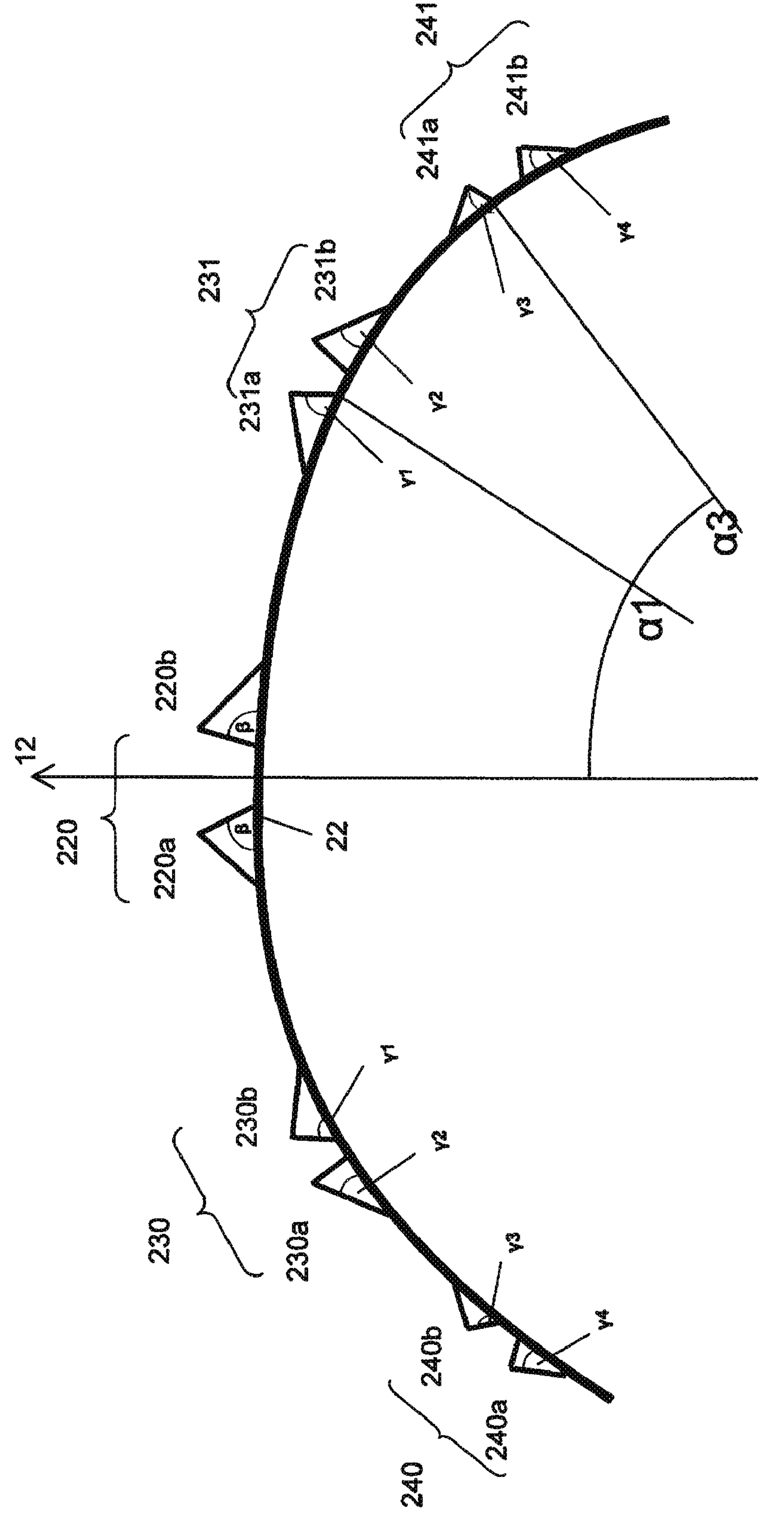
FIG. 4 shows a cross-section, similar to FIG. 2, through an alternative embodiment of the invention.
Figure 5:
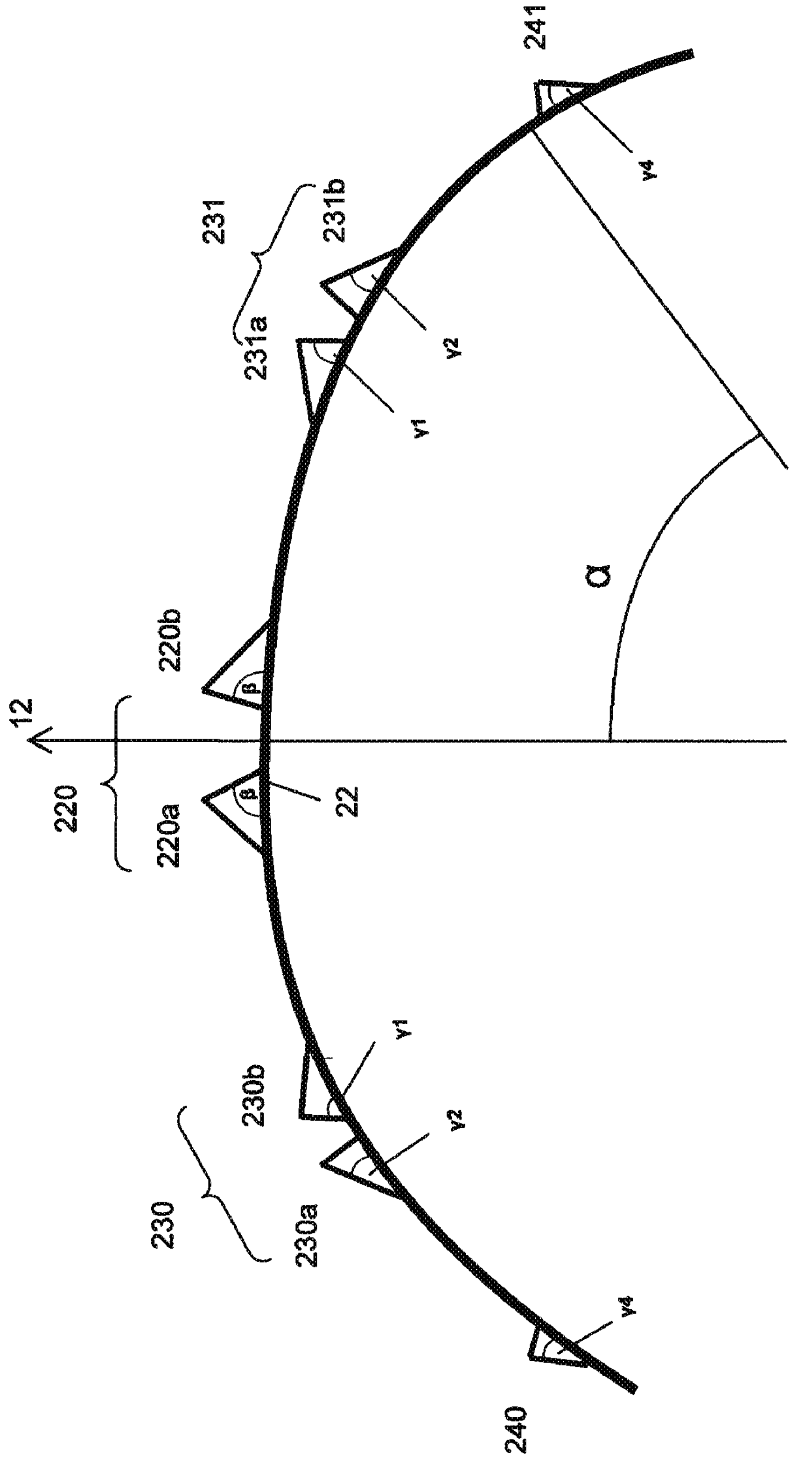
FIG. 5 shows a cross-section, similar to FIG. 2, through an alternative embodiment of the invention.

FIG. 5 shows a cross-section of another embodiment of the invention. This corresponds, in many elements, at least essentially to the embodiment of FIG. 4. This applies to the base structure 220 and the variant structures 230 and 231. In the mirror plane for the base structures, the apex axis of the surface runs as is shown for normal 12. The variant structures lying further to the outside (with larger α angles; variant structures 240 and 241 in the figure) are not, however, similar to both of the elements of the base structure, but rather only to the element of the base structure lying on the side of the normal 12 on which the variant structure also lies. Far away from the normal 12, this structure corresponds thusly to the structure of FIG. 3. In the proximity of the normal 12, it deviates from the structure and corresponds to the structure of FIG. 4.

It has been shown that the structure of FIG. 5 prevents interfering light reflexes, a so-called light edge, in the vicinity of the normal 12. Such light reflexes can interfere with the user of a working device and thus even reduce working safety.

Figure 6:
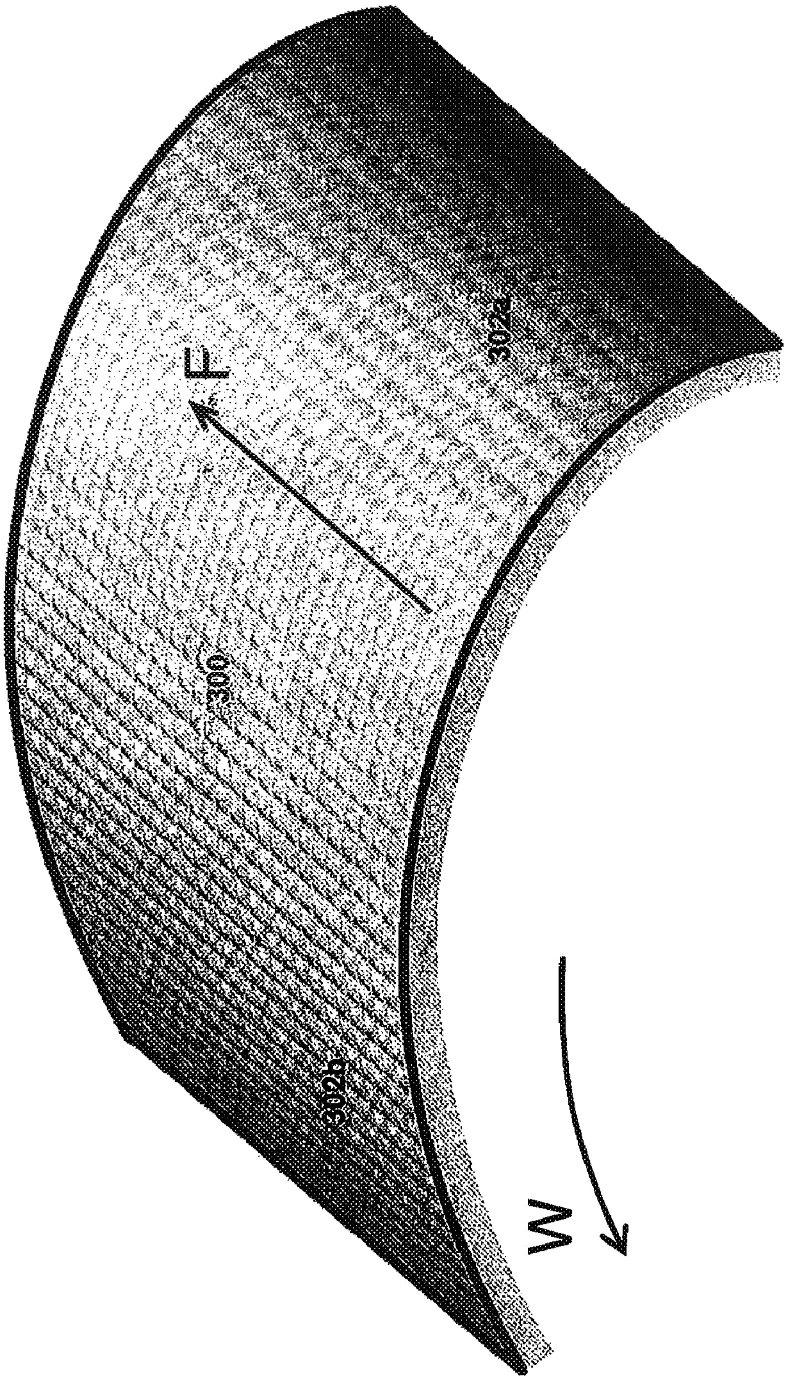
FIG. 6 shows a perspective view of a larger cutout of an inventive surface structure.

FIG. 6 shows a perspective view of a large cutout of a surface structure according to the invention. In this cutout, it is clear that an area, 300, is particularly suitable as the gripping area. This could serve, for example, for placement of a thumb. The thumb then exerts a higher pressure on this area than other parts of the hand. These parts of the hand are positioned, however, in area 302, which comprises areas 302*a* and 302*b* among others, and makes the grip more secure. However, in the parts of the surface farther away from the gripping center 300, the connection between the working device and the gripping hand is not as secure. This has the advantage that vibrations are transferred with less intensity. The depicted gripping pattern is intuitive in this respect as the thumb is placed, as a rule, securely in area 300 in order to exert a great amount of pressure there. On the other hand, it is also possible to place another finger or another area of the hand on area 300, so that the surface structure enables numerous grip positions.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm"

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A surface structure for a working device which has at least one curved surface, on which there is a first surface normal and a second surface normal, which forms an $\alpha$ angle, wherein the surface structure comprises a base structure, which has a base surface and at least one side surface, wherein the side surface, along with the base surface, forms a $\beta$ angle, and wherein the surface normal of the base surface of the base structure is parallel to the first surface normal, wherein the surface structure further comprises a variant structure, which comprises a base surface and at least one side surface, wherein a $\gamma$ angle is formed between the base surface and the side surface, wherein the variant structure is different from the base structure and wherein the surface normal of the base surface of the variant structure is parallel to the second surface normal, and the $\gamma$ angle is smaller than the $\beta$ angle by at least the amount of the $\alpha$ angle.

2. The surface structure according to claim 1, in which the curved surface is not curved in at least one direction.

3. The surface structure according to claim 2, in which the base structure is repeated in the at least one direction in which it is not curved.

4. The surface structure according to claim 1, in which the variant structure (30) is arranged in the direction of the curvature of the surface.

5. The surface structure according to claim 1, in which the variant structure (30) is mathematically similar to the base structure.

6. The surface structure according to claim 5, in which a multitude of similar variant structures is provided in the direction of the curvature of the surface.

7. The surface structure according to claim 6, in which the $\gamma$ angle of the variant structures continuously decreases.

8. The surface structure according to claim 7, in which all of the $\gamma$ angles are less than about 45°.

9. The surface structure according to claim 1, which comprises at least one base structure, which comprises two mirror-image base structural elements, and which comprises a variant structure, which comprises two mirror-image variant structural elements.

10. The surface structure according to claim 9, in which additional variant structures are provided for, which do not comprise mirror-image variant structural elements.

11. A working device having a surface structure according to claim 1 on at least one of its outer surfaces.

* * * * *